Patented May 24, 1927.

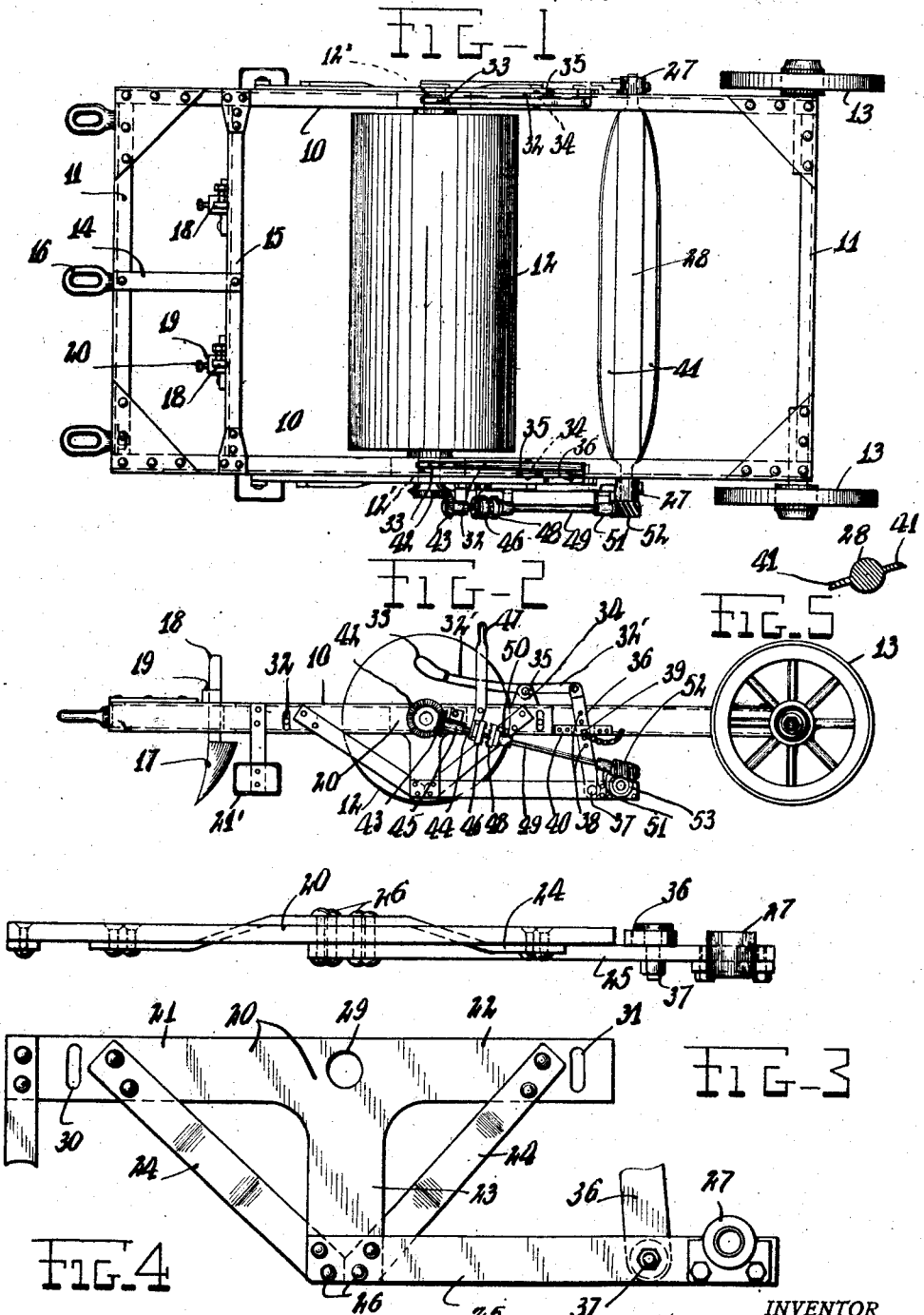

1,629,993

UNITED STATES PATENT OFFICE.

HELIODORO CHAVEZ, OF TOLEDO, OHIO.

SUGAR-BEET-HARVESTING MACHINE.

Application filed April 22, 1926. Serial No. 103,751.

This invention relates generally to harvesting machines, the invention having more particular reference to a novel type of sugar beet harvesting machine.

The invention has for an object the provision of an improved sugar beet harvesting machine adapted to "dig up" or remove the earth from the sugar beets.

A further object of the invention is the provision of an improved sugar beet machine adapted to cut the said sugar beets free from its roots.

For further comprehension of the invention, and of the objects and advantages thereof, reference will be had to the following description and accompanying drawing, and to the appended claims in which the various novel features of the invention are more particularly set forth.

Fig. 1, of the drawing, is a top plan view of my improved sugar beet harvesting machine.

Fig. 2, is a side elevational view thereof.

Fig. 3, is an enlarged top plan view of one of the adjustable frames for supporting the cutting knife.

Fig. 4, is a side elevational view thereof.

Fig. 5, is an enlarged side elevational view of the cutting knife.

As here embodied my improved sugar beet harvesting machine comprises a frame having side members 10, and cross members 11, suitably attached at the extremities of the side members 10. The roller 12, preferably of considerable weight, is rigidly attached to the axle 12' or shaft rotatively mounted in the side members 10, at or near the center thereof, the wheels 13, are rotatively mounted in the side members 10, at or near one extremity thereof, adjacent to one of the cross members 11. The draw bar 14, is rigidly attached, at or near, the center of the other cross member 11, and to the supplementary cross member 15, at or near its center, and extends or protrudes forward therefrom, and is provided with an eye 16. The ploughs 17, are provided with standards 18, extending upward therefrom, and slidably mounted in the brackets 19, which are provided with set screws 20, or any similar suitable means of holding the said ploughs 17 in any desired downward extended position, it being understood that the said brackets 19, are rigidily attached to the said supplementary cross member 15.

The above mentioned and described construction being such as will permit the said frame to be drawn over the ground, by horses, a tractor, or any suitable available means, attached to the said eye 16, of the draw bar 14, the said roller 12, and the said wheels 13 rotating, and the said ploughs 17, being so placed or positioned as to remove the earth from the sugar beets to be harvested.

Adjustable frames 20, consisting of T-shaped members having horizontally extended arms 21 and 22, and downwardly extended standards 23, braced by struts 24, and rigidly supporting horizontal members 25, as at 26, are pivotally attached by means of apertures 29 to the said axle 12' of the roller 12. The horizontally extended arms 21 and 22 are formed with elongated apertures 30 and 31 respectively. These apertures 30 and 31 engage extended members 32 suitably attached to the side members 10, so as to limit the possible movement of the adjustable frames 20. The horizontal members 25 have bearings 27 attached at their free extremities, and the cutting knife 28 is rotatably supported in these bearings.

As a means of moving the frame 20, so as to raise and lower the cutting knife, as may be desired, I have provided levers 32' with handles 33, pivoted as at 34 to brackets 35 rigidly attached to the side members 10. Pivotally attached to the extremities of the levers 32' are arms 36 pivotally attached as at 37 to the horizontal members 25. The arms 36 are provided with a plurality of apertures 38, adapted to receive pins 39 which are also engageable in apertures located in brackets 40 attached to the side members 10, so as to hold the cutting knife 28 in any desired position. The arms 36 are slidably held between the brackets 40 and the side members 10.

The cutting knife 28, is provided with blades 41, having cutting edges, removably attached to the cutting knife 28, and depending therefrom.

As a means of rotating the cutting knife 28, as may be desired, so as to position any one of the blades 41, in a usable position, I have provided a bevel gear 42, attached to the said axle 12', and meshing with a bevel pinion 43, attached to the shaft 44, rotatively mounted in the bearing 45, attached to the horizontal arm 22, and provided with an engaging member 46, slidably engaged with the said shaft 44, so as to slidably engage, by the lever 47, with the clutch member 48, attached to the shaft 49, rotatably mounted in bearings 50 and 51, attached to the horizontal extended arm 22, and to the horizontal member 25, respectively, and having a worm 52, attached thereto meshing with a worm wheel 53, attached to the cutting knife 28, it being understood that the said cutting knife 28 may be rotated when the engaging member 46 is engaged with the clutch member 48, when the said roller 12 is rotated, as hereinbefore mentioned and set forth.

In operation the device is moved or drawn to the left as viewed in Fig. 2, by a tractor or other power means, the spade members 17 being positioned at a suitable elevation to dig up the earth around the beets in advance of the roller 12 which breaks down and bends over the tops of the beets. After the beets have been passed over by the roller, the inclined knife blade is drawn thereunder cutting the roots thereof and freeing the beets from their hold upon the ground. When the roots have been cut and as the device progresses the beets pass upwardly over the blade roller 28 and fall upon the ground in the rear of the device. It should be understood that the elevation and inclination of the knife blade may be changed during operation of the device as may be desired.

While I have above described the preferred form, construction, and arrangement of the several elements employed, it will be understood that the device is, nevertheless, susceptible of considerable modification therein, and I therefore reserve the privilege of resorting to such changes as may be fairly embodied within the spirit and scope of the invention as claimed.

Having thus described my invention, what I claim as new and desire to protect by Letters Patent of the United States is as follows:

1. A device of the class described comprising a main supporting frame, a roller having an axle thereof journaled in said supporting frame, a bevel gear attached to said axle, an adjustable frame mounted on said main supporting frame having horizontal arms thereon, a rod journally mounted at one end on one of said horizontal arms and supported at its upper portion by attachment to said supporting frame, a cutting member journaled on the ends of said horizontal arms; a worm on the lower end of said rod, a worm wheel secured to said cutting member adapted to be driven by said worm for rotating said cutting member, a pinion journally mounted on said main frame meshing with said bevel gear adapted to be rotated thereby when said roller is turned, and clutch mechanism connected with said pinion and with said rod for transmitting motion from said pinion to said cutting member, said cutting member being rotatable to various inclinations for suitably positioning a blade therein.

2. A device of the class described comprising a main supporting frame, an adjustable frame comprising upper and lower horizontally extended arms and downwardly extended standards, braces for connecting said standards to said upper horizontal arms, bearings mounted on the forward ends of said lower horizontal arms, a cutter rotatably journaled at its ends in said bearings, a roller having an axle journaled on said supporting frame, said adjustable frame being pivotally mounted on the axle of said roller, and means for limiting the movement of said adjustable frame relative to said supporting frame comprising elongated slots in said adjustable frame and extension on said main supporting frame disposed in said slots.

In testimony whereof I have affixed my signature.

HELIODORO CHAVEZ.